US006594601B1

(12) United States Patent
Umminger, III et al.

(10) Patent No.: US 6,594,601 B1
(45) Date of Patent: Jul. 15, 2003

(54) SYSTEM AND METHOD OF ALIGNING SIGNALS

(75) Inventors: Frederick W. Umminger, III, Boulder, CO (US); David M. Lebolt, San Francisco, CA (US); Andrew H. Cook, Palo Alto, CA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/419,537

(22) Filed: Oct. 18, 1999

(51) Int. Cl.[7] ................................................ G06F 17/00

(52) U.S. Cl. ............................... 702/94; 700/94; 369/4; 381/119

(58) Field of Search ..................... 386/102, 52; 73/602; 702/191, 189; 381/119; 400/94; 369/4; 360/26

(56) References Cited

U.S. PATENT DOCUMENTS 4,591,928 A 5/1986 Bloom et al.
4,829,872 A 5/1989 Topic et al.
5,107,381 A * 4/1992 Mitsuhashi et al. ........... 360/70
5,774,452 A * 6/1998 Wolosewicz ................ 370/212
5,802,108 A * 9/1998 Kao ........................... 375/245
6,336,093 B2 1/2002 Fasciano

OTHER PUBLICATIONS

U.S. patent application Ser. No. 09/359,186, Umminger, Jul. 22, 1999.

* cited by examiner

*Primary Examiner*—Marc S. Hoff
*Assistant Examiner*—Paul Kim
(74) *Attorney, Agent, or Firm*—Peter J. Gordon

(57) ABSTRACT

The invention provides for a method and system for mixing two signals, a primary signal and another sample signal, in a manner that avoids the cancellation of certain frequency components in the resulting mixed signal. Advantageously, the resulting combination signal therefor likely retains more of the fullness of the original two signals.

32 Claims, 8 Drawing Sheets

SYSTEM AND METHOD OF ALIGNING SIGNALS

FIELD OF THE INVENTION

The present invention relates generally to digital signal processing techniques as applied to signal editing and more particularly to digital signal processing techniques for aligning a sample signal with a primary signal to avoid cancellation of frequencies when the two signals are combined.

BACKGROUND OF THE INVENTION

A common task in the production of a multimedia program involves the editing of an audio signal for the program. The audio signal is edited to enhance or augment the originally recorded audio. Typically, this involves either mixing other audio with the primary audio or totally replacing a portion of the primary audio with a new audio sample. In either case it is necessary to precisely identify the start of the audio segment audio that is to be edited so that the modified audio will seamlessly fit in with the rest of the audio. Frequently, the point of editing is associated with a particular sonic event such as a percussive hit or other distinctive, loud sound, and thus it becomes necessary to identify these events.

Co-pending U.S. patent application Ser. No. 09/359,186 titled "System and Method of Identifying a Sonic Event", filed on Jul. 22, 1999, which is incorporated by reference herein and has a common inventor and the same assignee as the present application, describes a system and method for identifying sonic events that are characterized by a rapid increase in volume. The method described in the application provides that the rate of change of the perceived volume of the audio signal is compared against a predetermined threshold value that corresponds to the sonic event of interest. The sound from a percussive instrument such as a piano, drum, or cymbal is an example of the type of sonic event contemplated.

As was described above, the editing of a previously recorded audio signal may involve substituting a portion of the recorded audio with a new audio sample or mixing or blending the two audio signals. Unfortunately, the mixing of two audio signals can produce a weak or thin sound as a result of the elimination of certain frequency components from the combined audio signal. The elimination of these frequency components occurs due to opposing signal magnitudes that cancel when the signals are combined. In other words, when the two signals are combined together the resulting signal may not include certain frequency components found in each individual signal because of a destructive interference between the two audio signals. The frequency spectrum of the blended signal is thus flattened, and consequently, the fullness of the sound is diminished.

It is therefor desirable to find a method and system for combining two signals that emphasizes the contribution of each signal to the resulting mixed signal as opposed to reducing these contributions due to the cancellation of certain frequency components.

SUMMARY OF THE INVENTION

The present invention provides for a method and system for mixing two signals, a primary signal and another sample, in a manner that avoids the cancellation of certain frequency components in the resulting mixed signal. The mixing of a primary signal with another sample signal or the replacement of one portion of the primary signal with another sample signal is initiated at the detection of a predetermined event in the primary signal. Advantageously, the resulting combination signal therefor retains more of the fullness of the original two segments.

In one aspect of the invention, the two signals to be mixed are audio signals. The mixing of a primary audio signal with another audio sample or the replacement of one portion of the primary audio signal with another audio sample is initiated at the detection of a predetermined sonic event in the primary audio signal. A sonic event may be characterized, in one case, as a rapid increase in the audio's volume, the rate of which exceeds a set threshold value. Examples of such a sonic event include sounds resulting from musical instruments such as a piano, a drum, or a cymbal, which are percussive. However, other sonic events of interest may be identified and are contemplated to be within the scope of the invention. Certainly the present invention is not limited to any particular sonic event, but rather broadly contemplates a sonic event as a detectable audio event that identifies a reference location for the mixing of the two audio signals or replacement of one audio signal with another.

In a further aspect of the invention, the blending of two audio samples is accomplished in a manner that enhances the contributions of each of the signals, rather than diminishing the effect of the combination.

In a further aspect of the invention, the two audio signals are combined or mixed after an A/D converter generates a digital representation of each audio signal. When a sonic event of interest has been detected in the primary digital signal, the signal is analyzed from the point of the sonic event forward to identify the first positive and first negative excursions within the waveform. Positive excursions are tracked from the time when the signal first turns positive until the time the signal becomes negative. Conversely, negative excursions are tracked from the time when the signal first turns negative until the time the signal becomes positive again. The sample or second signal is analyzed to determine all the positive and negative excursions within the signal. Unlike the investigation of the primary signal, the analysis of the sample signal is not complete after identification of the first positive and first negative excursion.

In a yet further aspect of the invention, the single data sample having the largest value in absolute magnitude is identified by comparing sample values of the digital signal representative of the primary audio from the first positive and first negative excursion after the detected sonic event, and the polarity of the excursion containing that data sample is noted. Similarly, the data sample, having the largest value in absolute magnitude with the same polarity as the largest data sample in absolute magnitude selected from the first positive and negative excursions of the primary signal after the sonic event, is also identified in the digital representation of the audio sample.

In a still further aspect of the invention, the primary audio signal and the other audio sample are aligned according to the data sample having the largest value in absolute magnitude from the first positive and first negative excursion of the primary signal and the data sample having the largest value in absolute magnitude having the same polarity as the largest data sample in absolute magnitude, identified in the first positive and negative excursions after the sonic event in the digital representation of the primary audio signal. Advantageously, emphasizing an alignment that recognizes the polarity of the signal reinforces the contribution of each signal.

In a yet further aspect of the invention, two audio samples are aligned with respect with each other so as to avoid cancellation of opposed signal components when the signals are combined.

A BRIEF DESCRIPTION OF THE DRAWINGS

A specific embodiment of the invention will now be described, by way of example, with reference to the accompanying drawings in which.

DETAILED DESCRIPTION

While the present invention is described with reference to audio signals for illustrative purposes, those of ordinary skill in the art will recognize that the invention is applicable to the alignment of any two digital signals, regardless of the content of the two signals. Therefor, the invention is not intended to embrace only audio signals, but rather the scope of the invention applies to a method and system for aligning any two digital signals.

Figure 1:
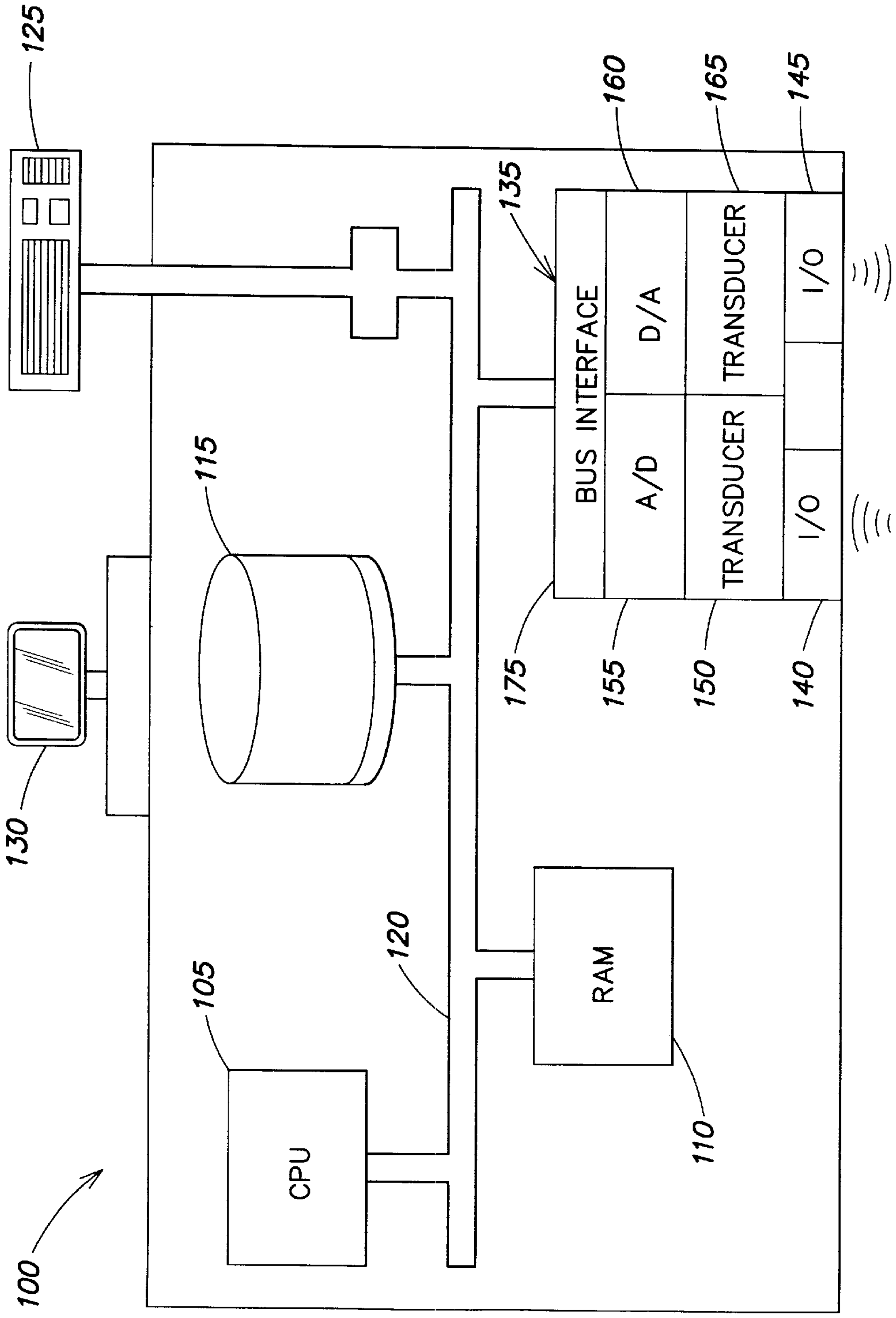
FIG. 1 is a schematic diagram of a computer system suitable for implementing a system for aligning two signals to be mixed together so as to avoid cancellation of certain frequency components in the combined signal.

Referring to FIG. 1 there is a shown as a schematic diagram a computer system for practicing the present invention. The computer system may be programmed using typical computer programming languages such as C or C++ which may then be compiled into object code and linked into code executable by the computer system, using a suitable compiler and linker as those of ordinary skill in the art will readily understand. Computer system 100 includes a central processing unit (CPU) 105 for executing computer instructions, a random access memory (RAM) 110 for storing the computer instructions and other data, and a non volatile memory 115 such as a hard disk or CDROM drive for permanently storing data. Computer system 100 further includes a computer bus 120 that allows for communication among the CPU 105, RAM 110, and non-volatile memory 115. A keyboard 125 connects to computer system 100 for entering alphanumeric data into computer system 100. A display monitor 130 is also connected to computer system 100 for displaying text and graphics data generated by the computer system 100.

Computer system 100 includes an audio adapter 135 for receiving and transmitting analog audio signals. The audio adapter 135 includes an audio port 140 for receiving an audio signal and an audio output port 145 for transmitting an audio signal. Audio input port 140 interfaces to a transducer 150 for converting the acoustic energy into electrical energy. An Analog-to-Digital (A/D) converter 155 samples the resulting electrical signal and generates a digital representation of the signal. Similarly, a digital-to-analog (D/A) converter 160 interfaces to a transducer 165 at audio output port 145 for converting a digital signal to an analog signal, prior to transmission by the transducer 165. The audio adapter 135 includes a computer bus interface 175 for transmitting or receiving digital data over communications bus 120 to or from the other components of computer system 100.

Computer system 100 may be programmed, for example, by using the computer programming languages referred to above, along with possibly other computer programming languages, to enable the detection of a sonic event within a primary audio signal that identifies a reference location for combining another audio sample with the primary audio signal. The primary audio signal and the audio sample are appropriately aligned to avoid cancellation of certain frequency components in the combination. The system and method, according to the present invention, are implemented in software and are executable on the CPU 105 of computer system 100.

In the following description it will assumed that the detection of a sonic event within a primary audio signal, such as a percussive hit, identifies a reference location for mixing the primary audio signal with another audio sample. The combination of the primary audio signal and the audio sample results in an enhancement to the primary audio. In one example, a sonic event is characterized by a fast rising increase in sound volume for which the rate of increase exceeds a predetermined threshold corresponding to the sonic event of interest. In the preferred embodiment of the invention, the onset of a sonic event is identified by the method described in the above referenced co-pending application entitled "System and Method of Identifying a Sonic Event", which is incorporated by reference herein. Briefly, the onset of a sonic event is determined by noting a change in the rate of increase or decrease in volume of the audio signal that exceeds a predetermined threshold. However, one of ordinary skill in the art will recognize that other techniques may be utilized to identify the sonic event of interest.

Figure 2A:
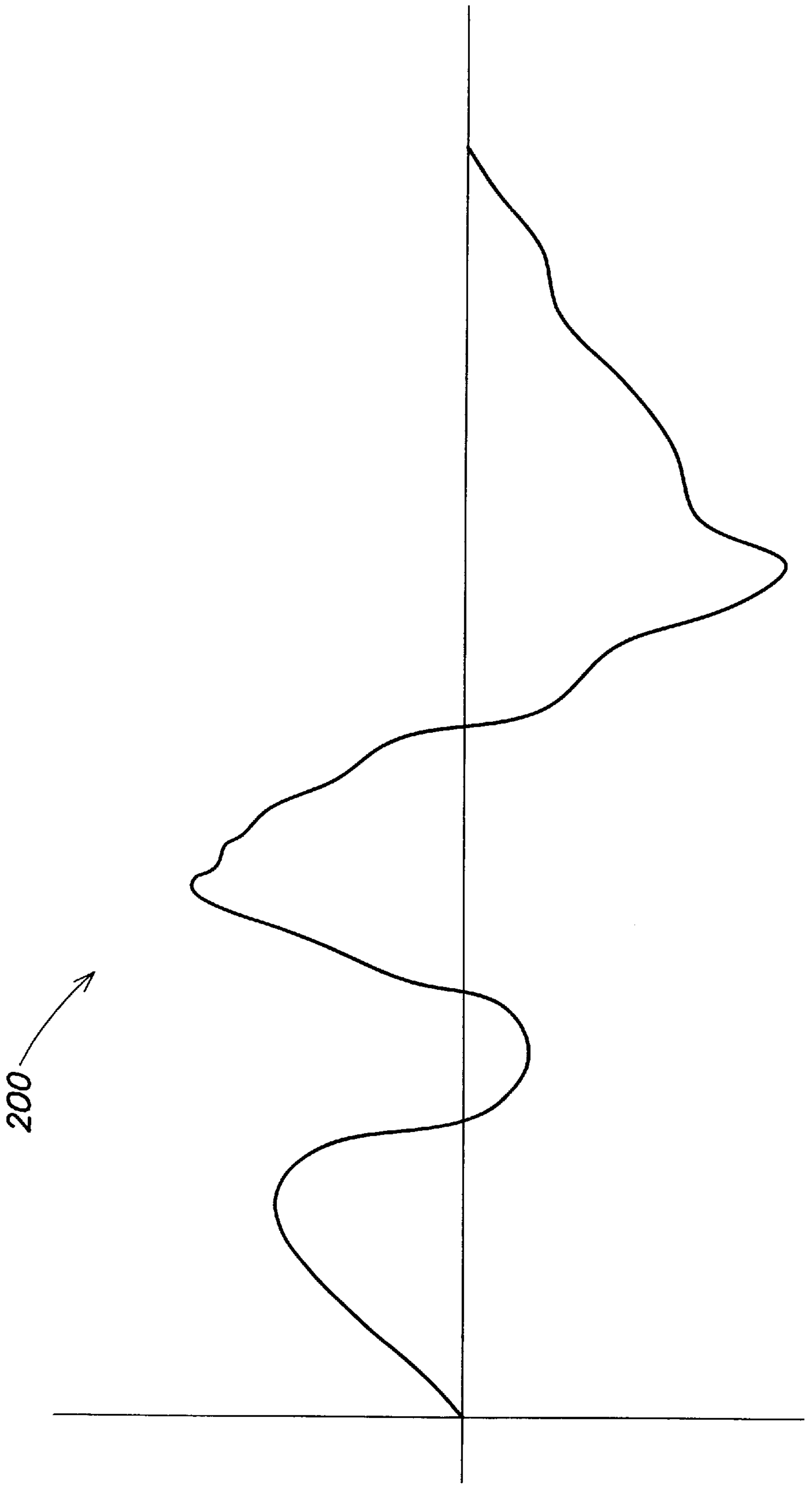
FIG. 2A depicts an analog signal representative of a primary sample.
Figure 3A:
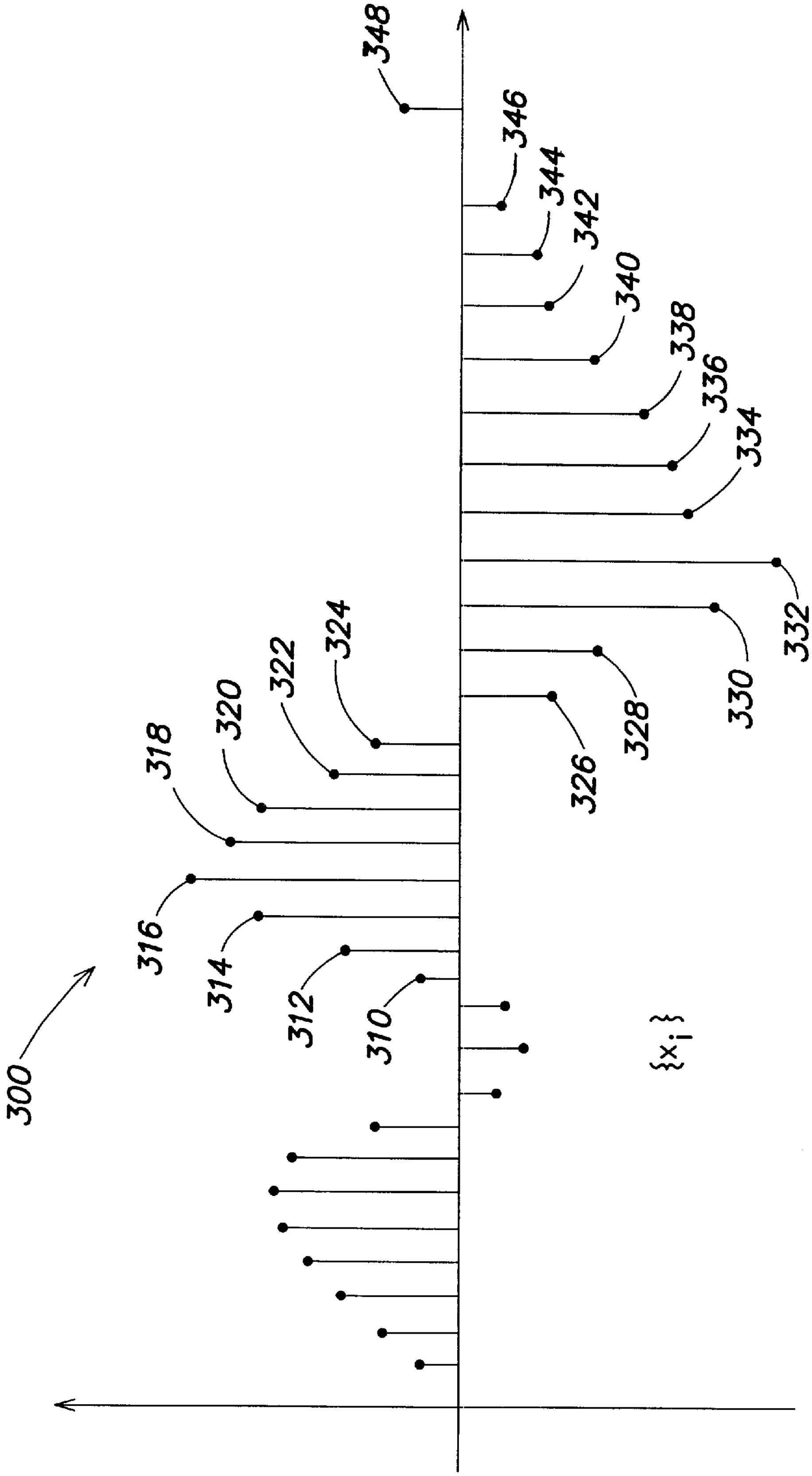
FIG. 3A depicts a sampled digital signal corresponding to the analog signal of FIG. 2A.

In one practice of the present invention, a stream of audio energy, the primary audio, is received by computer system 100 at audio input port 140. The audio may represent voiced or unvoiced audio. Unvoiced audio may include, but is not limited to, sound generated by musical instruments such as a drum, horn, or cymbal and also sounds produced by nature such as thunder. Transducer 150 converts the received acoustic energy to electrical energy, generating an audio signal 200, as shown in FIG. 2A that corresponds to the input stream of audio energy. The audio signal 200 is sampled at periodic intervals by the A/D converter 155 and the resulting sample values are quantized to generate a digital signal 300, as shown in FIG. 3A. The audio signal is typically sampled at 44.1 kHz or 48 kHz, but those of ordinary skill in the art will recognize that other sampling rates may be used and still be within the scope of the invention. After the A/D conversion and quantization by audio adapter 135, digital sample values $\{x_i\}$ are produced and sent via computer bus 120 to be stored in the RAM 110 for processing by software implementing the inventive method for aligning an audio sample to avoid cancellation of frequency components after the signals are mixed. The A/D converter 155 generates 16 or 24 bit values for each $x_i$ sample, depending on the actual A/D converter that is employed. The 16 or 24 bit values are converted to a 32 bit IEEE floating point format with 0 dB as digital full scale. It is the 32 bit IEEE floating point format that is used in implementing the system and carrying out the method of the present invention.

Figure 2B:
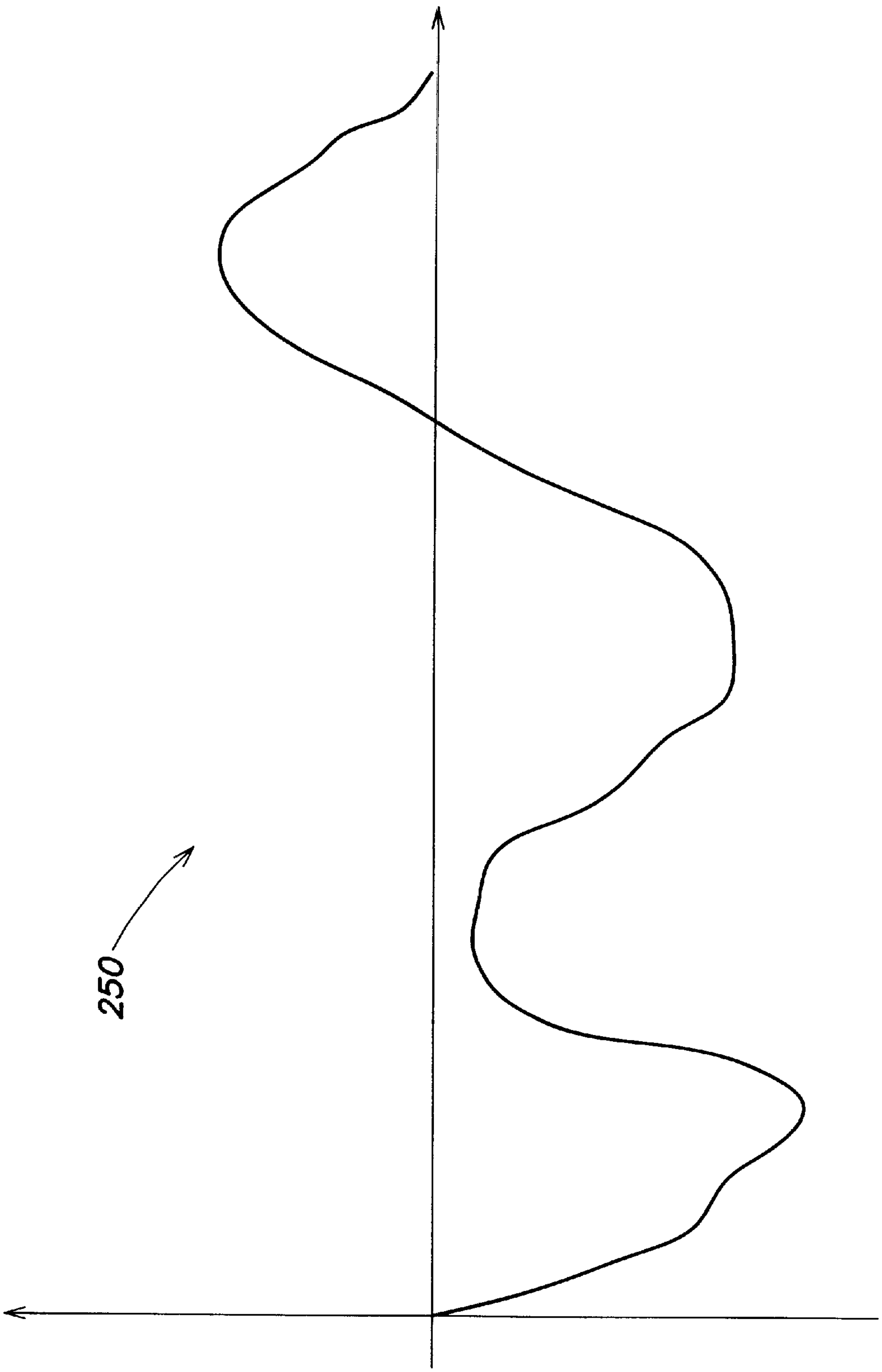
FIG. 2B depicts an analog signal representative of another sample signal that is to be combined with the signal of FIG. 2A.
Figure 3B:
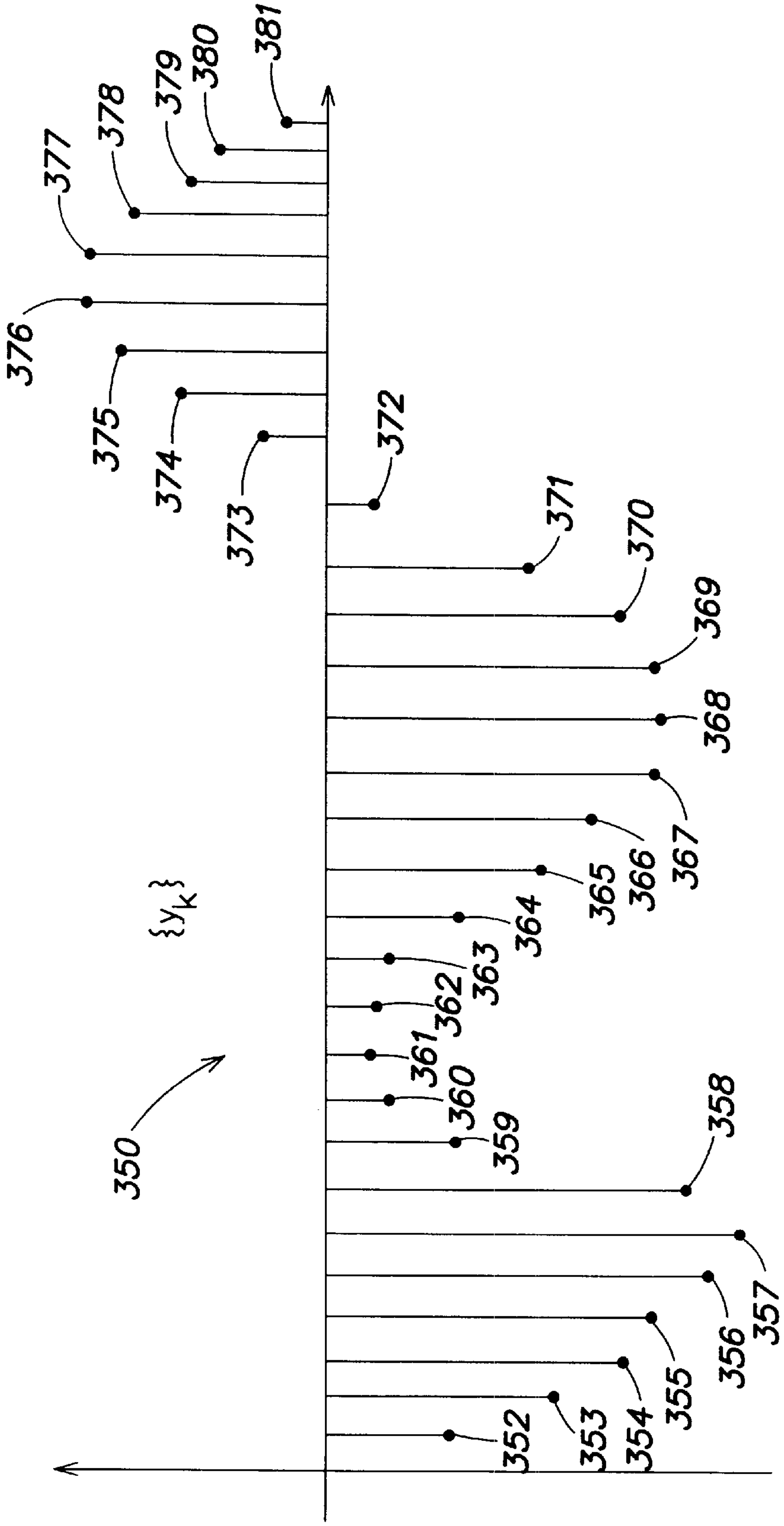
FIG. 3B depicts a sampled digital signal corresponding to the analog signal of FIG. 2B.

FIG. 2B depicts an analog audio signal 250 in graphical form that is representative of an audio sample that is introduced to augment the primary audio, according to the present invention. Audio signal 250 may be received over audio input port 140 or alternatively may be previously stored in the non-volatile memory 115 of computer system 100 in a digital representation for later retrieval. Storing the signal in digital form in the non-volatile memory 115 eliminates the necessity to perform a subsequent A/D conversion of the data. A digital representation of the audio sample 250 may be stored on the computer system using a CDROM, an internal hard disk, magnetic tape, or the like. FIG. 3B depicts an example of a digital signal 350 corresponding to the analog signal of FIG. 2B. As was described for the digital signal 300, digital signal 350 was generated by sampling the audio sample 250 and quantizing the sample values to produce a set of digital audio samples $\{y_i\}$.

The digital sample values $\{y_k\}$, having been stored in non-volatile memory or received over the audio port, are sent via computer bus 120 to be stored in the RAM 110 for processing by software implementing the described method for aligning an audio sample to avoid cancellation of frequency components after the signals are mixed. A 32 bit IEEE floating point format with 0 dB as digital full scale is used to represent the digital values $\{y_i\}$. It is the 32 bit IEEE floating point format that is used in carrying out the method of the present invention. One of ordinary skill in the art will recognize that other formats for representing the digital sample values may be used, and the invention is not limited to only the formats disclosed herein.

The present invention is directed to a system and method for aligning two digital signals to reduce the likelihood of the cancellation of certain frequency components after the mixing of the two signals. Referring now to FIG. 3A and FIG. 3B, the mixing or blending of the two signals $\{x_i\}$ and $\{y_k\}$ will now be discussed. Two audio signals, having digital representations of $\{x_i\}$ and $\{y_k\}$, are mixed together to produce a digital audio signal $\{x_i+y_k\}$. Therefor, it is clear that the mixing or blending of the two signals results in a digital signal that is additive in nature. Because of this additive effect, it is possible for certain frequency components to be eliminated due to a cancellation of opposing signal magnitudes. For example, the signals will offset each other for values of $x_i$ and $y_k$ that are nearly equal to each other, but have opposing polarity or sign. The resulting signal will be flat at these sample locations, and the combination of the two signals will not exhibit the frequency components of the original signals.

Figure 4A:
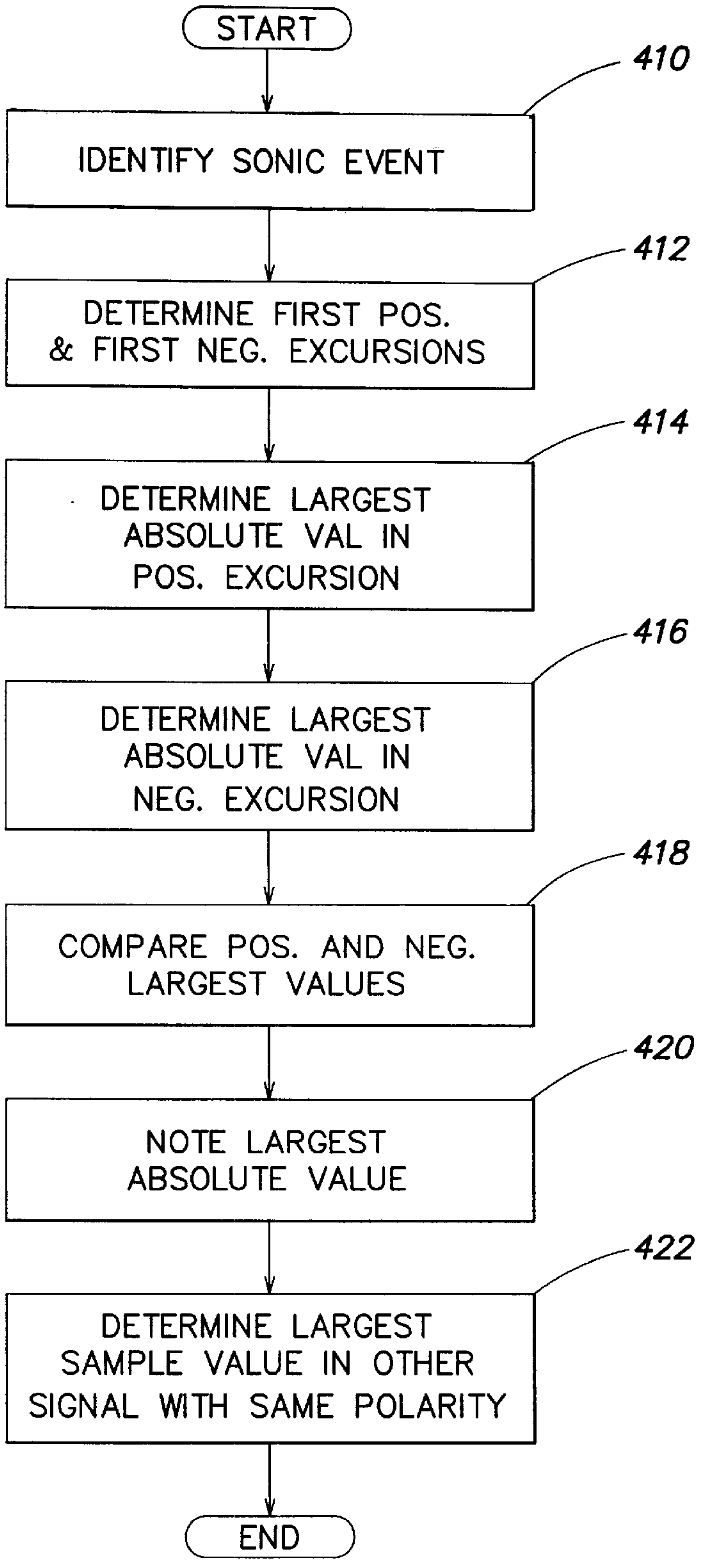
FIG. 4A shows a flow chart of the steps for determining the alignment point for aligning two signals to be mixed together to avoid cancellation of certain frequency components in the combined signal.
Figure 4B:
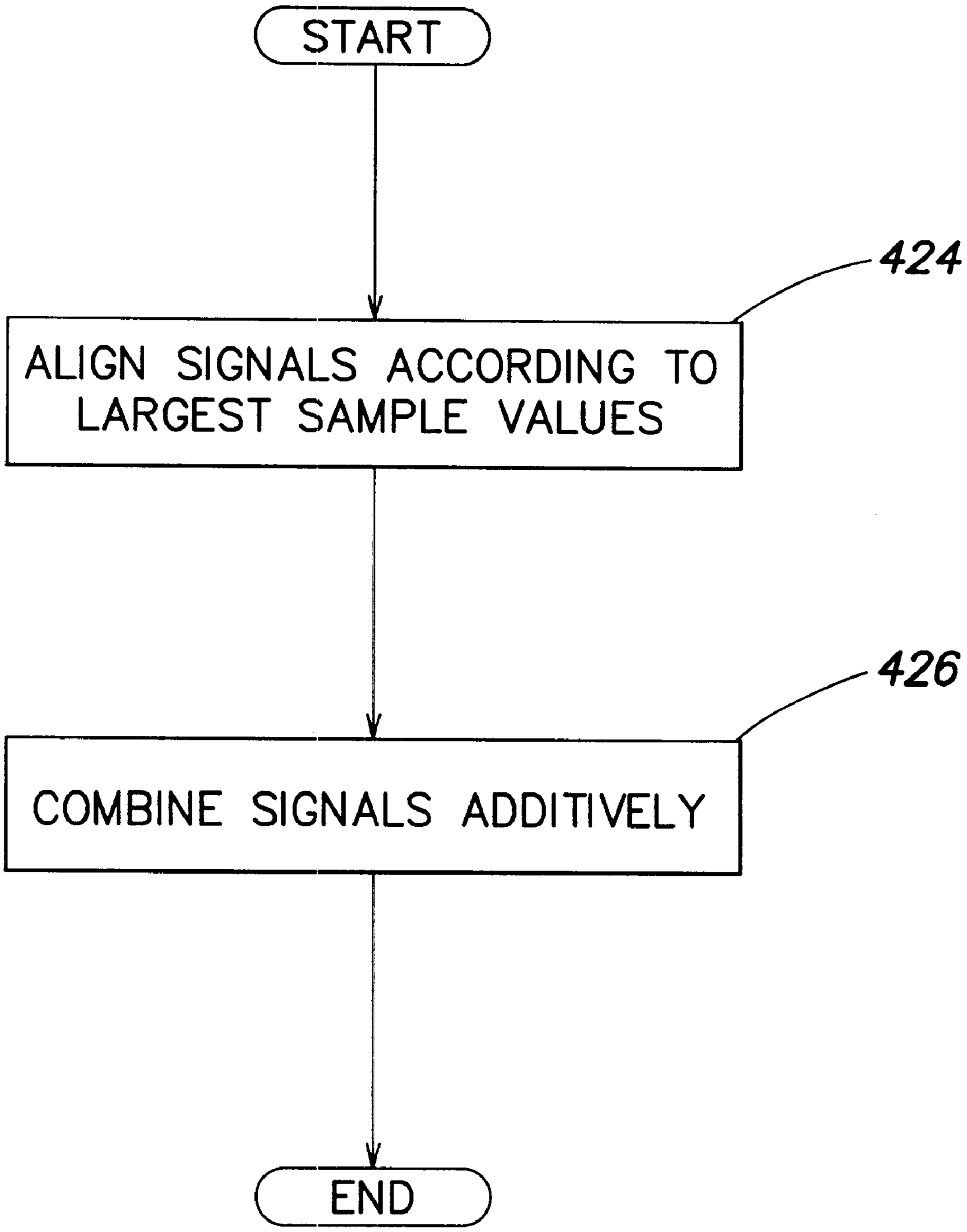
FIG. 4B shows a flow chart of the steps for mixing two signals to avoid cancellation of certain frequency components in the combined signal.

A description of the method of the current invention, implemented in software that executes on computer system 100 and aligns a digital audio sample 350 for mixing with a digital signal 300, is now provided with reference to the flow charts of FIG. 4A and FIG. 4B. It is assumed that the primary audio signal 200 and the sample audio signal 250 have been digitized through an A/D conversion to yield the digital signals $\{x_i\}$ and $\{y_k\}$ respectively. Furthermore, it is also assumed that a particular sonic event of interest such as a percussive hit or other distinctive sound has been identified in the primary audio 200 as the reference point for the start of the mixing process.

The onset of the sonic event of interest is found, in one embodiment of the invention, using the inventive method of detection described in the above referenced patent application titled "System and Method of Identifying a Sonic Event", which is incorporated by reference herein. Specifically, using the numerical techniques described therein and a predetermined threshold value that corresponds to the particular sonic event of interest, the sonic event is identified. The sonic event indicates the start location for mixing the primary signal with the sample signal. One of ordinary skill in the art will recognize that other methods and techniques can be utilized to determine the sonic event of interest, and the present invention is not limited to the particular method disclosed in the above referenced application.

For illustrative purposes in describing the present invention, it will be assumed at step 410 of FIG. 4A that digital sample 310, as shown in FIG. 3A, has been found to mark the onset of the sonic event of interest for the digital audio signal 300, and is thus the reference point for mixing the two signals.

Using the reference point 310, which identifies the onset of the particular sonic event of interest for digital signal 300, as a starting position, the first positive and first negative excursions of the digital signal 300 are determined in step 412. A positive excursion of the digital signal 300 is defined as the sample values from the time the digital signal 300 turns positive until the next time it next turns negative. Likewise, a negative excursion of the digital signal 300 is defined as the sample values from the time the digital signal 300 turns negative until the next time it turns positive. For example with reference to FIG. 3A, a positive excursion of 8 samples values occurs from the digital sample value 310 to the digital sample value 324, and a negative excursion of 11 samples values occurs from the digital sample value 326 to the digital sample value 346.

After identifying the first positive and first negative excursions of the digital signal 300, the data sample having the largest value in absolute magnitude within the first positive excursion is determined in step 414. The data sample having the largest value in absolute magnitude within the first negative excursion is also determined in step 416. Again with reference to FIG. 3A, the sample value from the first positive excursion after the sonic event of interest that has the largest value in absolute magnitude in digital signal 300 is the sample value identified at data sample 316. Similarly, the sample value from the first negative excursion after the sonic event of interest that has the largest value in absolute magnitude is the sample value identified at 332. The largest sample value 316 in absolute magnitude for the first positive excursion and the largest sample value 332 in absolute magnitude for the first negative excursion are compared in step 418 without regard to the polarity of the values, and the data sample having the larger absolute value is identified and the polarity of this sample is noted in step 420. Still referring to FIG. 3A, data sample 332 from the negative excursion has a larger value in absolute magnitude than data sample 316 from the positive excursion.

Referring now to FIG. 3B, there is shown a digital signal 350, representative of the analog audio sample 250. The audio sample 250 is to be mixed with the primary audio signal 200 in order to augment the primary audio signal 200. As was discussed above, the digital signal 300, representative of the primary audio signal 200, is augmented by the digital signal 350 in a manner that enhances the contribution of each signal, and avoids cancellation of frequency components due to destructive interference between the signals.

Still referring to FIG. 4A, the process for mixing the digital signal 300 and digital signal 350 is further described.

Digital signal 350 includes 30 digital sample values shown as samples 352 through 381 in FIG. 3B. In step 422, the digital signal 350 is investigated to determine the sample value having the largest absolute magnitude with the same polarity as the largest sample value previously identified in the digital signal 300. Again, a positive excursion of the digital signal 350 is defined as the set of sample values from the time the digital signal 350 turns positive until the next time it turns negative. A negative excursion of the digital signal 350 is similarly defined as the set of sample values from the time the digital signal 350 turns negative until the next time it turns positive. By example, the largest sample value in absolute magnitude of the digital signal 300, after the sonic event of interest, was found in the negative excursion, and thus the largest negative sample value in digital signal 350 is determined from all the negative excursions of the digitized sample signal. Similarly, if the largest sample value in absolute magnitude was found in the first positive excursion of the digital signal 300, the largest positive sample value from all the positive excursions would be identified in digital signal 350.

Digital signal 350 includes one positive excursion and one negative excursion. The positive excursion comprises 9 digital samples, represented as sample points 373 through 381. The negative excursion comprises 21 digital samples, represented as sample points 352 through 372. While digital signal 350 is shown, for simplicity reasons, to have only one positive and one negative excursion, the invention contemplates the use of other digital signals that may include more than one positive or negative excursion. Thus the method of the present invention reflects the more general condition of determining the largest sample value in absolute magnitude from the total of all the excursions, in digital signal 350, having the same polarity as the largest sample value in absolute magnitude in digital signal 300. With reference to data signal 350, the largest negative sample value is sample 357.

With reference to FIG. 3A, FIG. 3B, and also FIG. 4B, the digital signals 300 and 350 are aligned for subsequent mixing of the signals according to the following procedure. Having determined the sample value having the magnitude without regard to polarity for the first positive and negative excursions after the sonic event of interest for digital signal 300 in step 420, the digital signal 300 and digital signal 350 are aligned in step 424 by associating that digital sample with the largest sample value having the same polarity in digital signal 350. Now with reference to the specific digital signals 300 and 350, the alignment technique, according to the present invention, will be further described.

As was previously discussed, the largest sample value without regard to polarity was found in step 420 to be the negative sample 332 for the digital signal 300. In step 422, the largest sample value in absolute magnitude was found in the digital signal 350 having the same polarity (i.e. negative) as that of the identified sample value 332 of digital signal 300. That sample was the sample identified by reference number 357 in FIG. 3B. Digital signal 300 and digital signal 350 are combined, according to the present invention in step 424 of FIG. 4B, such that the largest sample value in absolute magnitude from the first positive excursion or first negative excursion of digital signal 300, after the sonic event of interest, is aligned with the largest sample value in absolute magnitude from all the excursions in digital signal 300, having the same polarity as the identified sample of digital signal 300. With reference to digital signal 300 and digital signal 350, sample 332 of digital signal 300 is aligned, according to the present invention, with sample 357 of digital signal 350 prior to mixing the two signals.

Figure 5:
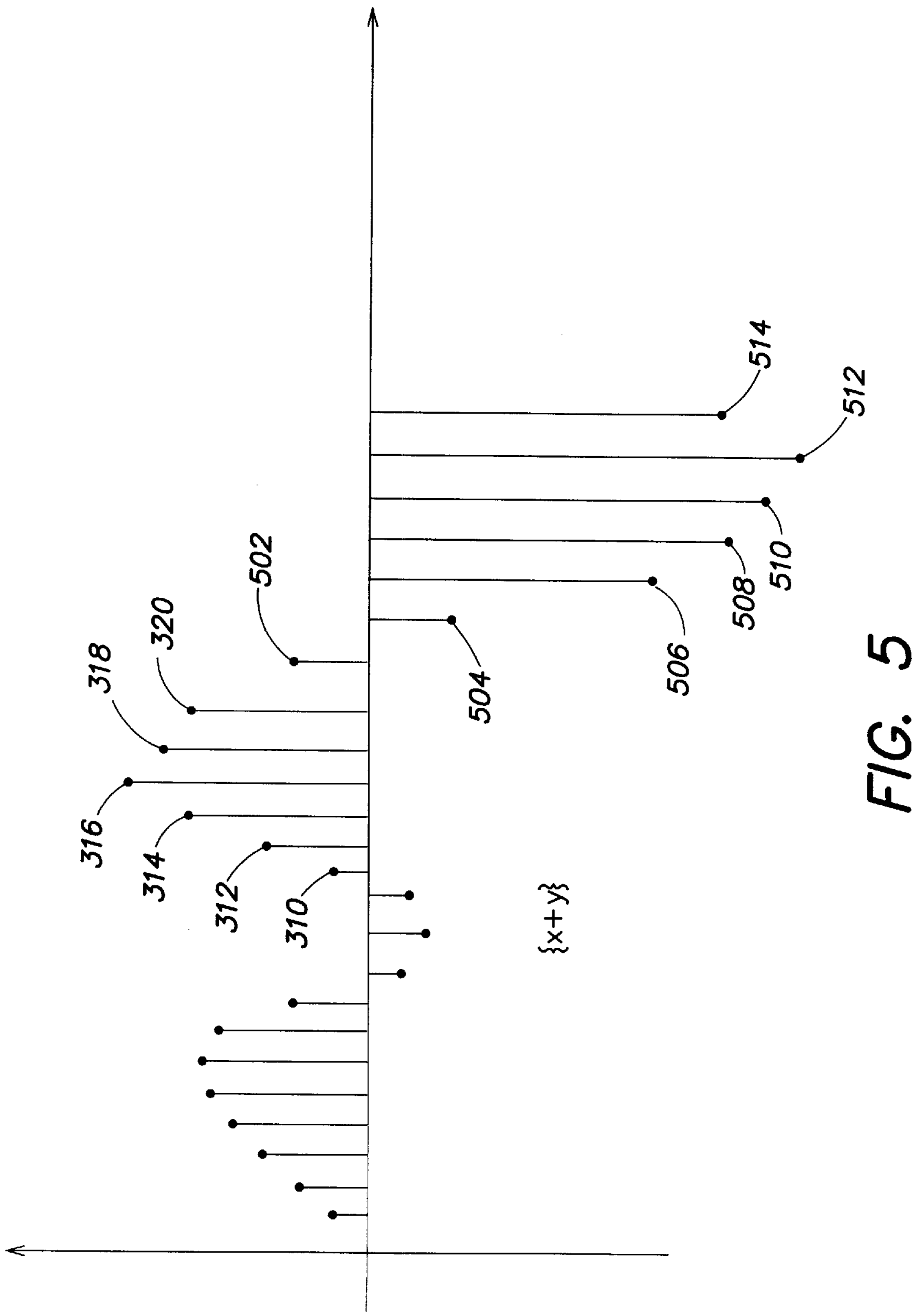
FIG. 5 depicts a digital signal that is generated by mixing a primary signal and a sample signal, according to the present invention.

Continuing, the digital signal 300 and digital signal 350 are combined additively in step 426 such that the mixed digital signal, as shown in FIG. 5, is the sum of the digital samples aligned according to the present invention. Therefore, sample value 332 of digital signal 300 is summed with the sample value 357 of the digital signal 350 to obtain the sample value 512 in FIG. 5. The summation continues sample by sample. In this example and because of the alignment of sample value 332 with sample value 357, the $x_i$ of digital signal 300 is summed starting at sample 326 with the $y_k$ of digital signal 360 starting at the 352 sample value to generate the digital values starting at 502 in FIG. 5, until all the samples values associated with the digital signal 350 have been exhausted. For those samples values of digital signal 300 prior to sample 322 there is no corresponding sample from digital signal 350, and these values are not changed. Of course, if there were samples prior to sample 352 of the digital signal 350, these samples also would be added to the corresponding sample value of digital signal 300. In essence, the alignment point for the mixing of that signal and the audio sample is fixed and the signals are summed sample by sample respecting the correspondence resulting from the alignment. The mixed digital signal 500 is the digital summation of the aligned signals. The digital signal 500, resulting from mixing the primary signal and sample signal according to the present invention, can of course be converted to an analog waveform by a Digital-to-Analog (D/A) conversion of the digital sample values.

Because the alignment of the two signals takes into account the polarity of the excursions, the contribution of each signal is enhanced in the region of the largest sample value, and thus the audio is likely have a fuller sound than if the two signals were mixed without regard to polarity. Advantageously, the method of the present invention avoids a destructive interference of the signals in the region of the largest excursion for the primary signal.

In one embodiment of the invention, the sample signal 250 replaces a portion of the primary signal 200. In this embodiment, the two digital signals 300 and 350 are aligned according to the same method described above by identifying in digital signal 300 the largest sample value in absolute magnitude from the first positive excursion or the first negative excursion after the sonic event of interest and the corresponding largest sample value from digital signal 350 with the same polarity as the largest sample identified in digital signal 300. After alignment of the signals, the sample values of digital signal 350 replace the sample values of digital 300 instead of combining with the signal.

Having described the invention, it should be apparent to those of ordinary skill in the art that the foregoing is illustrative and not limiting. Numerous modifications and other embodiments are within the scope of one of ordinary skill in the art and are contemplated as falling within the scope of the invention as defined by the appended claims.

We claim:

1. A method of generating a mixed, digital signal on a computer system, the mixed, digital signal consisting of a combination of a first digital signal and a second digital signal, the method comprising the steps of:

selecting a first digital sample from a positive excursion of said first digital signal and selecting a second digital sample from a positive excursion of said second digital signal;

aligning said first digital signal with said second digital signal in response to said selected first digital sample and said selected second digital sample; and summing the aligned first and second digital signals to generate said mixed digital signal.

2. The method of claim 1 further including the step of: detecting a designated event prior to selecting said first digital sample.

3. The method of claim 1 wherein said step of selecting a first digital sample includes selecting a first digital sample with the largest magnitude from said positive excursion of said first digital signal.

4. The method of claim 3 wherein said step of selecting a second digital sample includes selecting a second digital sample with the largest magnitude from said positive excursion of said second digital signal.

5. The method of claim 4 wherein said step of selecting detecting a designated event prior to selecting said first digital sample.

6. The method of claim 5 wherein said step of selecting a first digital sample includes selecting a first digital sample from the first positive excursion after said designated event.

7. The method of claim 1 wherein said first and second digital signals are audio signals.

8. The method of claim 5 wherein said designated event is a sonic event.

9. A method of generating a mixed, digital signal on a computer system, the mixed, digital signal consisting of a combination of a first digital signal and a second digital signal, the method comprising the steps of:

selecting a first digital sample from a negative excursion of said first digital signal and selecting a second digital sample from a negative excursion of said second digital signal;

aligning said first digital signal with said second digital signal in response to said selected first digital sample and said selected second digital sample; and summing the aligned first and second digital signals to generate said mixed digital signal.

10. The method of claim 9 wherein said step of selecting a first digital sample includes selecting a first digital sample with the largest absolute value of magnitude from said negative excursion of said first digital signal.

11. The method of claim 10 wherein said step of selecting a second digital sample includes selecting a second digital sample with the largest absolute value of magnitude from said negative excursion of said second digital signal.

12. The method of claim 9 further including the step of: detecting a designated event prior to selecting said first digital sample.

13. The method of claim 12 wherein said step of selecting includes detecting a designated event prior to selecting said first digital sample.

14. The method of claim 9 wherein said step of selecting a first digital sample includes selecting a first digital sample from the first excursion after said designated event.

15. The method of claim 9 wherein said first and second digital signals are audio signals.

16. The method of claim 12 wherein said designated event is a sonic event.

17. A method of generating a mixed, digital signal on a computer system, the mixed, digital signal consisting of a combination of a first digital signal and a second digital signal, the method comprising the steps of:

selecting a first digital sample from a positive excursion of said first digital signal and selecting a second digital sample from a negative excursion of said first digital signal;

comparing said first digital sample and said second digital sample and choosing either said first or second digital sample according to which digital sample has the largest absolute value of magnitude;

selecting a third digital sample from said second digital signal, said third digital sample being the sample having largest absolute value of magnitude in said second digital signal with the same polarity as said chosen digital sample;

aligning said first digital signal with said second digital signal in response to said chosen digital sample and said selected third digital sample; and summing the aligned first and second digital signals to generate said mixed digital signal.

18. A system for generating a mixed, digital signal, the mixed, digital signal consisting of a combination of a first digital signal and a second digital signal, the system comprising:

a first selector for selecting a first digital sample from a positive excursion of said first digital signal and selecting a second digital sample from a negative excursion of said first digital signal;

a comparator for comparing said first digital sample and said second digital sample and choosing either said first or second digital sample according to which digital sample has the largest absolute value of magnitude;

a second selector for selecting a third digital sample from said second digital signal, said third digital sample being the sample having largest absolute value of magnitude in said second digital signal with the same polarity as said chosen digital sample;

an aligner for aligning said first digital signal with said second digital signal in response to said chosen digital sample and said selected third digital sample; and a summer for summing the aligned first and second digital signals to generate said mixed digital signal.

19. The system of claim 18 further including:

a monitor element for detecting a designated event, wherein said first selector is responsive to said monitor element.

20. The system of claim 18 wherein said first and second digital signals are audio signals.

21. A computer readable media for storing computer instructions thereon, said computer instructions programmed to perform a method for generating a mixed, digital signal on a computer system, the mixed, digital signal consisting of a combination of a first digital signal and a second digital signal, said method comprising the following steps:

selecting a first digital sample from a positive excursion of said first digital signal and selecting a second digital sample from a positive excursion of said second digital signal;

aligning said first digital signal with said second digital signal in response to said selected first digital sample and said selected second digital sample; and summing the aligned first and second digital signals to generate said mixed digital signal.

22. The computer readable media of claim 21 further including the step of:

detecting a designated event prior to selecting said first digital sample.

23. The computer readable media of claim 21 wherein said first and second digital signals are audio signals.

24. The computer readable media of claim 22 wherein said designated event is a sonic event.

25. A computer readable media for storing computer instructions thereon, said computer instructions programmed to perform a method for generating a mixed, digital signal on a computer system, the mixed, digital signal consisting of a combination of a first digital signal and a second digital signal, said method comprising the following steps:

selecting a first digital sample from a negative excursion of said first digital signal and selecting a second digital sample from a negative excursion of said second digital signal;

aligning said first digital signal with said second digital signal in response to said selected first digital sample and said selected second digital sample;

summing the aligned first and second digital signals to generate said mixed digital signal.

26. The computer readable media of claim 25 further including the step of:

detecting a designated event prior to selecting said first digital sample.

27. The computer readable media of claim 25 wherein said first and second digital signals are audio signals.

28. The computer readable media of claim 26 wherein said designated event is a sonic event.

29. A computer readable media for storing computer instructions thereon, said computer instructions programmed to perform a method for generating a mixed, digital signal on a computer system, the mixed, digital signal consisting of a combination of a first digital signal and a second digital signal, said method comprising the following steps:

selecting a first digital sample from a positive excursion of said first digital signal and selecting a second digital sample from a negative excursion of said first digital signal;

comparing said first digital sample and said second digital sample and choosing either said first or second digital sample according to which digital sample has the largest absolute value of magnitude;

selecting a third digital sample from said second digital signal, said third digital sample being the sample having largest absolute value of magnitude in said second digital signal with the same polarity as said chosen digital sample;

aligning said first digital signal with said second digital signal in response to said chosen digital sample and said selected third digital sample; and summing the aligned first and second digital signals to generate said mixed digital signal.

30. The computer readable media of claim 29 further including the step of:

detecting a designated event prior to selecting said first digital sample.

31. The computer readable media of claim 30 wherein said designated event is a sonic event.

32. A method of generating a mixed, digital signal on a computer system, the mixed, digital signal consisting of a combination of a first digital signal and a second digital signal, the method comprising:

selecting a first digital sample from a first excursion of said first digital signal, wherein the first excursion has a polarity;

selecting a second digital sample from a second excursion of said second digital signal, wherein the second excursion has the polarity of the first excursion;

aligning said first digital signal with said second digital signal in response to said selected first digital sample and said selected second digital sample; and summing the aligned first and second digital signals to generate said mixed digital signal.

* * * * *